(12) United States Patent
Olsson et al.

(10) Patent No.: US 9,094,915 B2
(45) Date of Patent: Jul. 28, 2015

(54) METHOD AND COMMUNICATION DEVICE FOR POWER SAVINGS IN CHIP-TO-CHIP SIGNALLING

(75) Inventors: Thomas Olsson, Karlshamn (SE); Anders Carlsson, Lund (SE); Bengt Lindoff, Bjärred (SE); Johan Nilsson, Höllviken (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 149 days.

(21) Appl. No.: 14/000,616

(22) PCT Filed: Feb. 16, 2012

(86) PCT No.: PCT/EP2012/052677
§ 371 (c)(1),
(2), (4) Date: Oct. 23, 2013

(87) PCT Pub. No.: WO2012/113703
PCT Pub. Date: Aug. 30, 2012

(65) Prior Publication Data
US 2014/0056195 A1 Feb. 27, 2014

Related U.S. Application Data

(60) Provisional application No. 61/450,861, filed on Mar. 9, 2011.

(30) Foreign Application Priority Data

Feb. 25, 2011 (EP) ..................................... 11156031

(51) Int. Cl.
*H04W 52/02* (2009.01)
*H04L 1/00* (2006.01)

(52) U.S. Cl.
CPC ......... *H04W 52/0245* (2013.01); *H04L 1/0001* (2013.01); *H04L 1/0006* (2013.01); *H04W 52/0209* (2013.01)

(58) Field of Classification Search
CPC ... H04L 1/0001; H04L 1/0003; H04L 1/0006; H04L 1/0009; H04L 1/0036; H04L 1/0045; H04L 1/0075; H04L 1/0091; H04L 1/0631; H04L 1/1829; H04L 7/00; H04L 7/0079; H04W 52/00; H04W 52/02; H04W 52/0203; H04W 52/0206; H04W 52/0209; H04W 52/0222; H04W 52/0225; H04W 52/0245; H04W 52/04; H04W 52/06; H04W 52/10; H04W 52/18; H04W 52/241; H04W 52/245; H04W 52/246; H04W 52/247; H04W 52/248; H04W 52/26; H04W 52/262; H04W 52/265; H04W 52/267
See application file for complete search history.

(56) References Cited

U.S. PATENT DOCUMENTS 6,108,561 A     8/2000  Mallinckrodt
7,206,332 B2 *  4/2007  Kwan et al. ................... 375/140
(Continued)

FOREIGN PATENT DOCUMENTS

DE     102008039148 A1    3/2009
EP         1973253 A1    9/2008
(Continued)

OTHER PUBLICATIONS

Digital Interface Working Group. "Logical, Electrical and Timing Characteristics EGPRS Version." DigRF Baseband / RF Digital Interface Specification, Feb. 20, 2004, pp. 1-32, Version 1.12.

*Primary Examiner* — Warner Wong
(74) *Attorney, Agent, or Firm* — Murphy, Bilak & Homiller, PLLC (57) ABSTRACT

A method in a communication device and a communication device (100) for adapting a transmission of data are provided. The transmission is transferred from a first chip (110) to a second chip (120) over a chip-to-chip interface (104, 304). The chip-to-chip-interface comprises a wired connection between the first chip and the second chip which is comprised in the communication device. The communication device receives (201) the radio signal (330), comprising the transmission of data from another communication device. The communication device determines (202), from the received radio signal (330), modulation and coding information, which is used for determining (203) a channel quality. Further, the communication device (100) adapts (204) the transmission of data based on the determined channel quality of the received radio signal (330) in such way that at least the determined channel quality is obtained when transferring (205) the transmission of data over the chip-to-chip interface to the second chip.

8 Claims, 4 Drawing Sheets

(56) References Cited

U.S. PATENT DOCUMENTS

| | | |
|---|---|---|
| 7,756,483 B2 | 7/2010 | Chang et al. |
| 8,611,288 B1* | 12/2013 | Zhang et al. ............... 370/329 |
| 2004/0085934 A1* | 5/2004 | Balachandran et al. ...... 370/335 |
| 2005/0135497 A1* | 6/2005 | Kim et al. .................. 375/267 |
| 2007/0098093 A1* | 5/2007 | Kwon et al. ................ 375/260 |
| 2007/0099577 A1* | 5/2007 | Lee et al. ..................... 455/69 |
| 2009/0036117 A1 | 2/2009 | Sollenberger et al. |
| 2009/0175360 A1* | 7/2009 | Soni et al. .................. 375/241 |
| 2010/0098185 A1* | 4/2010 | Miyazaki .................... 375/267 |
| 2010/0128622 A1* | 5/2010 | Horiuchi et al. ............. 370/252 |
| 2010/0265929 A1* | 10/2010 | Liao et al. .................. 370/338 |

FOREIGN PATENT DOCUMENTS

| | | |
|---|---|---|
| WO | 0041318 A1 | 7/2000 |
| WO | 2009023587 A2 | 2/2009 |

* cited by examiner

METHOD AND COMMUNICATION DEVICE FOR POWER SAVINGS IN CHIP-TO-CHIP SIGNALLING

TECHNICAL FIELD

The present disclosure relates to a method in a communication device and a communication device for adapting a transmission of data to be transferred from a first chip to a second chip over a chip-to-chip interface.

BACKGROUND

Power consumption is a critical issue for many modern radio receivers. As an example, it is of particular interest to keep the power consumption low, when a radio receiver is powered by a battery. By decreasing the power consumption, time between recharging or exchange of the battery may be extended.

A known radio receiver may be a user equipment (UE). It shall be noted that in other examples, the radio receiver may be a radio base station. The user equipment may be configured to be able to communicate with a cellular radio communication network, such as an Long Term Evolution (LTE) network, a WCDMA/HSPA network or the like. The user equipment comprises a radio frequency chip (RF chip) for receiving a radio signal from the cellular radio communication network. Moreover, the user equipment comprises a base band chip for receiving a RF signal from the RF chip. An interface between the RF chip and the base band chip is denoted a chip-to-chip interface, which provides a wired communication link between the RF and base band chips. As an example, the interface may be implemented using a standard, such as DigRF. DigRF is a standard for specifying differential digital signaling for chip-to-chip communication. The chip-to-chip interface may be designed to be able to handle a worst case scenario. That is, chip-to-chip interface may be designed to transfer data from the RF chip to the base band chip at a highest possible data rate. A problem associated with the transfer of data over the chip-to-chip interface may be that the power consumption is unnecessarily high.

SUMMARY

An object is to reduce power consumption of a radio receiver, such as a user equipment.

According to an aspect, the object is achieved by a method in a communication device for adapting a transmission of data. The transmission is transferred from a first chip to a second chip over a chip-to-chip interface. The chip-to-chip-interface comprises a wired connection between the first chip and the second chip which are comprised in the communication device. The communication device receives the radio signal comprising the transmission of data from another communication device. The communication device determines modulation and coding information of the received radio signal. Next, the communication device determines a channel quality of the received radio signal based on the determined modulation and coding information. Further, the communication device adapts the transmission of data based on the determined channel quality of the received radio signal such that at least the determined channel quality is obtained when transferring the transmission of data over the chip-to-chip interface to the second chip. The communication device transfers the transmission of data to the second chip over the chip-to-chip interface.

According to another aspect, the object is achieved by a communication device for adapting a transmission of data. The communication device is configured to transfer the transmission from a first chip to a second chip over a chip-to-chip interface. The chip-to-chip interface is a wired connection between the first chip and the second chip within the communication device. The communication device comprises a radio receiver configured to receive, the radio signal which comprises a transmission of data from another communication device. The communication device further comprises a determining unit configured to determine the modulation and coding information of the received radio signal. The determining unit is further configured to determine a channel quality of the radio signal based on the determined modulation and coding information. The communication device further comprise an adapting unit configured to adapt the transmission of data based on the determined channel quality of the received radio signal such that at least the determined channel quality is obtained when transferring the transmission of data. A transmitting unit is configured to transfer the transmission data over the chip-to-chip interface to the second chip.

The communication device adapts the transmission of data over the chip-to-chip interface between, for example, a RF chip and a baseband chip. This is performed by adapting the channel quality of the transmission of data to a required channel quality, which is given by channel quality of the received radio signal. Hereby, power consumption of the communication device may be adapted to current requirements, such as requirements based on signal properties of the received radio signal, for the transmission of data.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Briefly described embodiments herein provide a concept for adapting the signal quality in case of an analogue signal or number of transmitted bits in case of a digital signal Embodiments herein provide means for adapting the signal quality of a signal to be transferred over the chip-to-chip interface based on observations of signal properties of a received signal. Signal properties, or radio channel characteristics, of a received signal may be signal to noise ratio (SNR) or modulation and coding information of the received signal. The modulation and coding information may be modulation and coding schemes.

By way of example, the signal quality of the signal to be transferred over the chip-to-chip interface may be SNR in case the signal to be transferred is an analogue signal.

Furthermore, as another example, the signal quality of the signal to be transferred over the chip-to-chip interface may be based on number of bits, i.e. bits per sample or frame, in case the signal to be transferred is a digital signal.

The present solution is applicable for LTE as well as WCDMA/HSPA. Some background information regarding LTE and WCDMA/HSPA is provided in the following two paragraphs.

In LTE, information, such as scheduling, is signaled dedicated to each wireless communication device on a Physical Downlink Control Channel (PDCCH), which PDCCH share the same downlink time, frequency and transmission power resources as a shared channel carrying the user data, i.e. a Physical Downlink Shared Channel (PDSCH). The PDCCH share frequency resources with the PDSCH, indicating that the PDCCH and the PDSCH are separated in time. The PDCCH may use 1 to 3 of the first Orthogonal Frequency-Division Multiplexing (OFDM) symbols of a sub frame. A sub frame may comprise 14 OFDM symbols. Thus, the PDSCH may use the 11 to 13 OFDM symbols following after the 1 to 3 OFDM symbols used by the PDCCH.

Wideband Code Division Multiple Access (WCDMA) is another multiple-access technology, where user equipments receive data on different downlink channelization codes. In High-Speed Downlink Packet Access (HSDPA), where all user equipments share the same High-Speed Downlink Shared Channel (HS-DSCH) for data, they also need to be informed about the scheduling information, i.e. the downlink channelization codes and the transport format of the transmission. So here, the scheduling information comprises HS-DSCH channelization code and transport format, which is signaled on the High Speed Shared Control Channel (HS-SCCH). The HS-SCCH and the HS-PDSCH may share same base station power resource and same scrambling code, but they may have different channelization codes.

Figure 1:
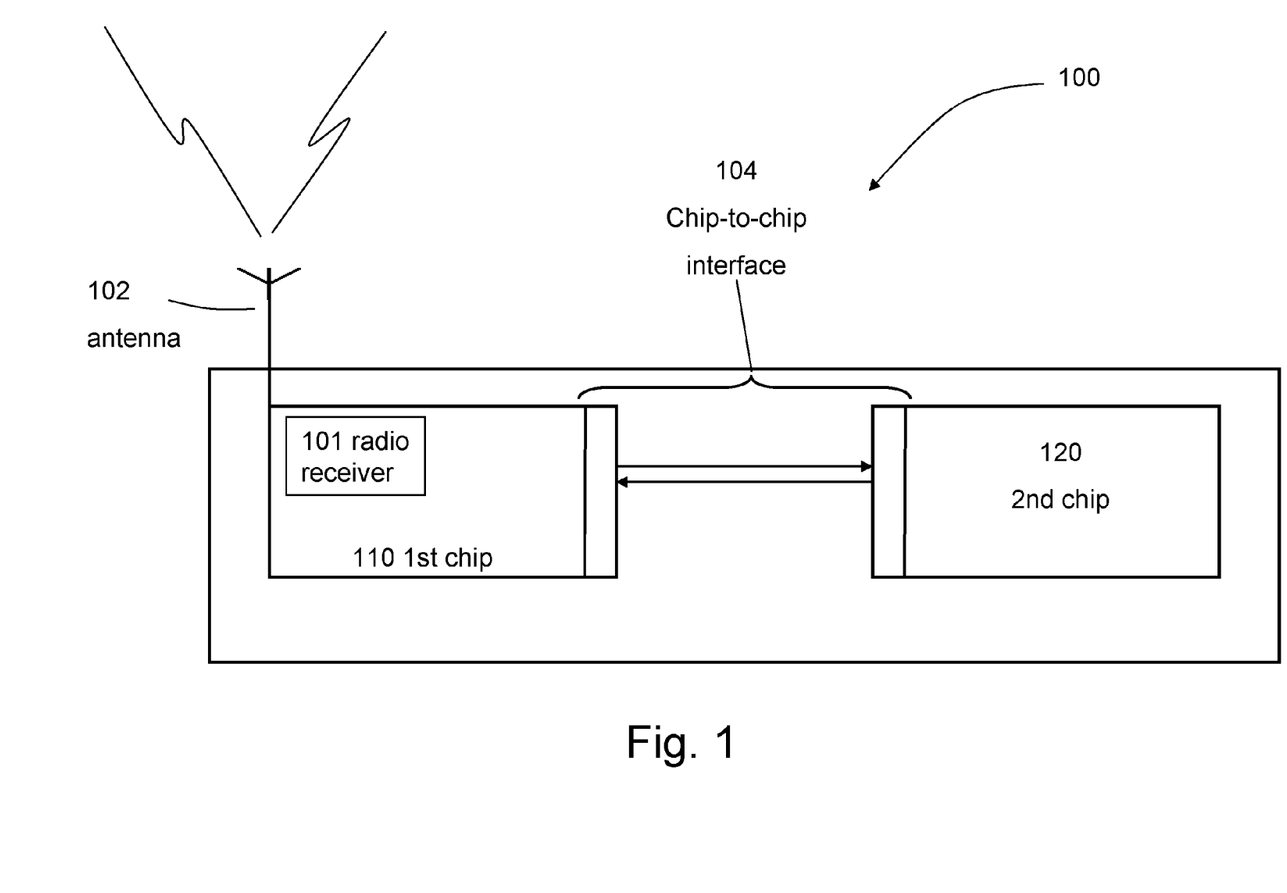
FIG. 1 is a schematic block diagram illustrating embodiments of a communication device.

FIG. 1 depicts an exemplifying communication device 100. The communication device 100 may be a user equipment, a base station or the like. The communication device 100 may be comprised in a wireless communication system, such as an LTE communication system, a WCDMA communication system with or without HSPA capabilities or any other wireless communications system capable of using multiple-access technology.

The communication device 100 comprises a radio receiver 101, an antenna 102 and a chip-to-chip interface 104. The radio receiver 101 receives a radio signal from another communication device The chip-to-chip interface 104 may constitute a connection between a first chip 110, such as a RF chip, and a second chip 120, such as a baseband chip. Moreover, the connection may be a wired connection.

Figure 2:
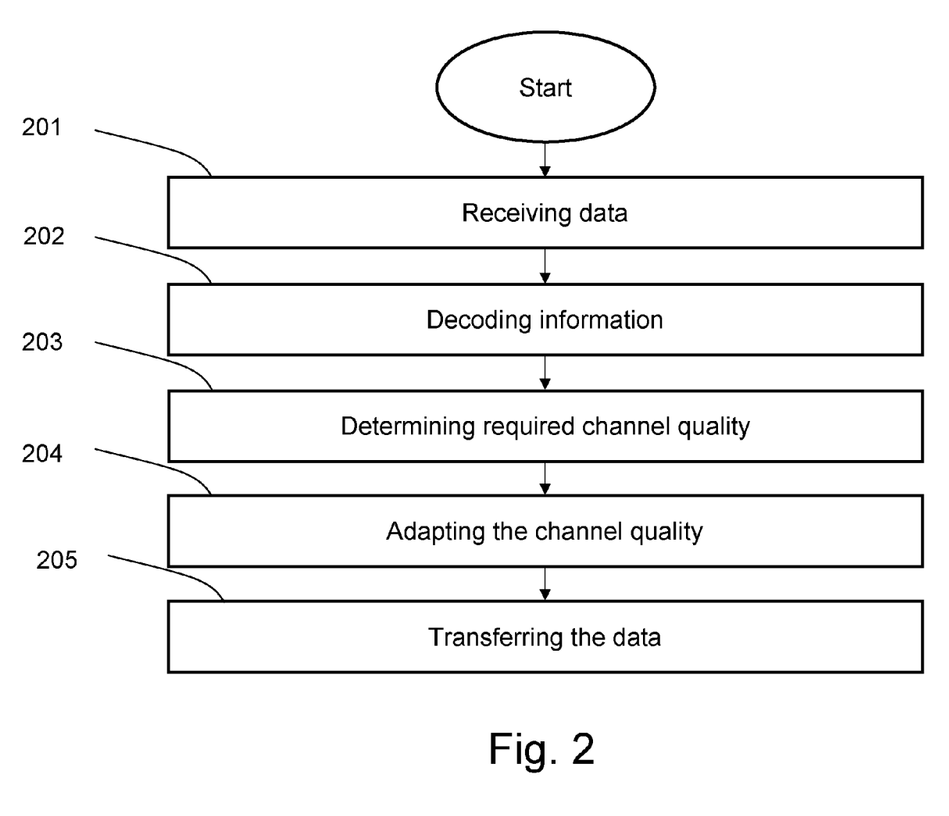
FIG. 2 is a flowchart depicting embodiments of a method.

Turning to FIG. 2, there is shown a schematic flowchart of an exemplifying method in a communication device 100 for adapting a transmission of data to be transferred from a first chip 110 to a second chip 120 over a chip-to-chip interface 104. The chip-to-chip interface 104 in the communication device 100 is a wired interface between the first chip 110 and the second chip 120. In some embodiments, the radio signal is an analogue communication signal. In some embodiments, the radio signal is a digital communication signal.

The method may comprise the following actions, such as steps, which actions may as well be carried out in another suitable order than described below:

Action 201. The communication device 100 receives the radio signal comprising the transmission of data from another communication device (not shown), such as a user equipment, a base station or the like.

Action 202. The communication device 100 determines the modulation and coding information of the received radio signal. This action may be performed when the received radio signal is decoded. As an example, when the communication device is comprised in an LTE communication system, the modulation and coding information may be extracted from the PDCCH of the received radio signal.

Action 203. The communication device 100 determines a channel quality of the received radio signal based on the determined modulation and coding information of the received radio signal.

If the received radio signal is an analogue signal, the determining 203 of the channel quality of the received radio signal may be based on a signal to noise value (SNR) of the received radio signal. As an example, a channel quality for the transmission of data with an SNR value in line with the SNR value of the received radio signal and/or in line with the modulation scheme of the received radio signal is sufficient for the transferring of the transmission of data to be performed with maintained, or at least only neglictably reduced, channel quality. Therefore, a reduction of the SNR value may be possible is some cases.

The same reasoning holds for a digital signal, but instead of reduced channel quality the number of bits per sample is reduced. Thus, if the received radio signal is a digital signal, the channel quality of the received radio signal may be based on a number of bits of the received radio signal. Hence, as an example, a resolution in bits per frame may be used as channel quality of the received radio signal. If the resolution of the transmission of data is higher than the resolution of the received radio signal, it is possible to decrease the resolution of the transmission of data. Expressed somewhat differently, if the number of bits per sample of the transmission of data is higher than the number of bits per sample of the received signal, the number of bits per sample of the transmission of data may be reduced such as to match the number of bits per sample of the received signal.

Action 204. The communication device 100 adapts the transmission of data based on the determined channel quality of the received radio signal such that at least the determined channel quality is obtained when transferring the transmission of data. By way of example, the transmission of data is adapted such that at least the determined channel quality is obtained for the transmission of data when being transferred.

If the received radio signal is a digital signal, the adapting 204 of the channel quality over the chip-to-chip interface 104 may be performed by adjusting an amount of bits per sample of the transmission of data.

Figure 3A:
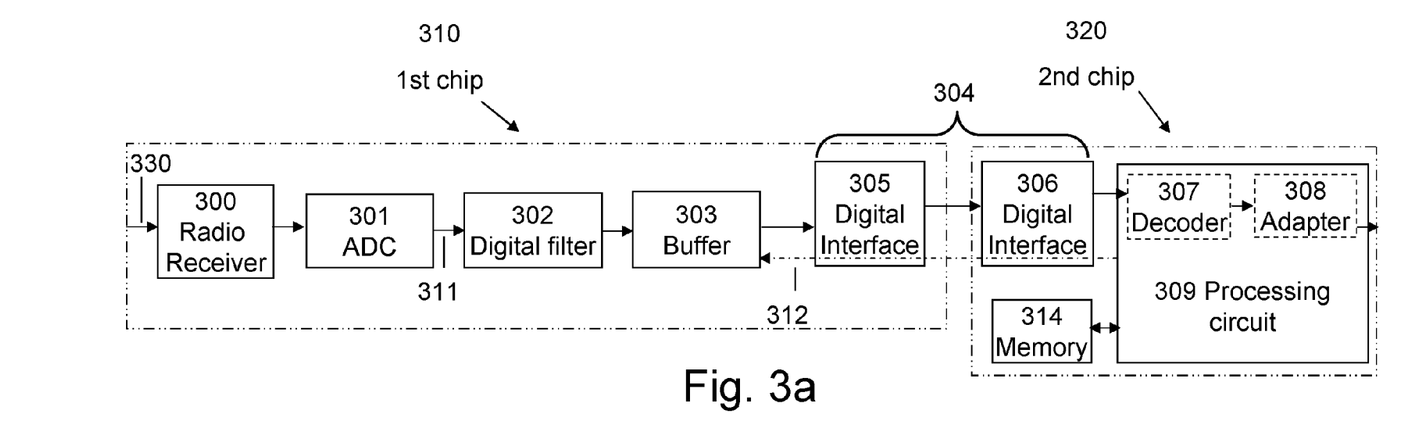
FIGS. 3a and 3b are schematic block diagrams illustrating an exemplifying, communication device comprising a first and a second chip.
Figure 3B:
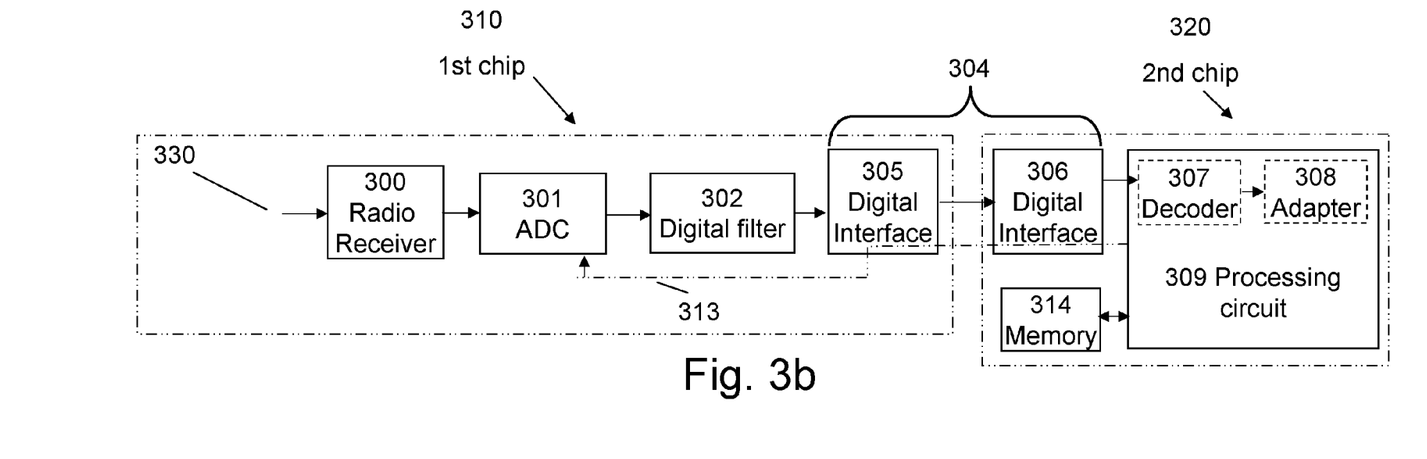

If the received radio signal is an analogue signal, the adapting 204 the transmission of data based on the determined channel quality of the chip-to-chip interface 104 is performed by changing the physical channel properties of a wire connecting a first digital interface 305 and a second digital interface 306 as explained in conjunction with FIGS. 3a and 3b. This may be related to slew-rate.

Action 205. The communication device 100 transfers the adapted transmission of data over the chip-to-chip interface 104 to the second chip 120. In this manner, an adapted channel quality is obtained for the transmission of data such that power consumption of the communication device 100 is decreased.

In some embodiments, the channel quality is adapted, or set up, by means of predetermined values or by using a lookup table. The predetermined values may have been calculated in advance. As an example, the look-up table may map the modulation and coding format to number of bits to use over the chip-to-chip interface 104.

If the channel quality is based on SNR value of the received radio signal, then the SNR value may be related to a predetermined threshold. Thereby, improvements in SNR may be detected. If an improvement is detected, it may be necessary to increase the channel quality for the transmission of data.

In the following, there is described a few methods for reducing channel quality of a received analogue radio signal in order to obtain power savings in the communication device.

A method of reducing channel quality of an analogue radio signal is to increase a load impedance. An increased load impedance implies a reduced signal current, which in turn implies reduces power consumption. This may be performed on both the receiver and the transmitter side. This will result in increased reflections at the interface between the transmission line, i.e. the wired connection between the first and second chip, and the receiver or transmitter input, i.e. at the first or second chip. Moreover, this may impose restrictions on the possible value of SNR to be transmitted over the chip-to-chip interface 104.

Another method of reducing an analogue radio signal may be to decrease the signal amplitude, and thereby reduce the power needed for transferring of the transmission of data.

In the following, there is described a few methods of reducing channel quality of a received digital radio signal.

A method of reducing the channel quality may be to reduce an amount of bits for each sample of the digital radio signal. The reduction may be performed by decreasing the amount of bits in relation to a set threshold. The reduction of bits may be made after or in an Analog/Digital Converter (ADC).

Another method of reducing the channel quality may be to reduce a clock rate of the digital transmission. A reduced clock rate is mainly used in conjunction with reduced bit resolution, which implies reduced channel quality. That is, a lower number of bits enables the possibility to use slower transmission, i.e. use a reduced clock rate for transferring of the transmission, over the chip-to-chip interface, and still fulfill timing requirements. A consequence of the reduction of the clock rate for a transfer of the transmission of data may be that reduced power in a Phase-Locked Loop (PLL) and logic may be used.

Yet another method for reducing the channel quality may be to decrease so called transmission burst lengths and thereby enabling longer time for power down. A transmission burst length may be a time period starting at the beginning of a transfer of the transmission of data and ending at the end of the transfer of the same transmission of data. Thus, if the amount of bits in the chip-to-chip communication may be reduced, less amount of data is being passed over the interface and the transmission may start later and still be finished in-time, i.e. at or before reception of a subsequent sub frame or slot. In this manner, it is made possible to power down PLL, logic and more for a longer time period.

With reference to FIG. 3a-3b and FIG. 4a-4b, there is illustrated some examples of how bit resolution for a transmission of the chip-to-chip interface may be adjusted, based on the radio channel characteristics, such as SNR and/or modulation scheme. The determination of the channel quality, see action 203 above, is based on the radio channel characteristics.

A radio signal 330, as depicted in FIG. 1 and now in FIGS. 3a and 3b, is received into an ADC 301 of the first chip 310, for example a radio frequency chip (RF). The radio signal 330 is after the ADC 301 transmitted through a digital filter 302 and a buffer 303 to a first digital interface 305 on the first chip 310. Further, the radio signal 330 is transmitted to a second digital interface 306 on a second chip 320, for example a baseband chip. The first and second digital interfaces 305, 306 may be comprised in the chip-to-chip interface 304. In the second chip 320, the radio signal 330 is transmitted to a processing circuit 309 for decoding the radio channel characteristics, such as SNR, modulation and coding schemes.

The radio channel characteristics are then the basis for the channel quality which is adapted in the processing circuit 309.

A few examples of modulation schemes are quadrature phase shift keying (QPSK), 16-quadrature amplitude modulation (16-QAM), 64-quadrature amplitude modulation (64-QAM) and the like.

Figure 4A:
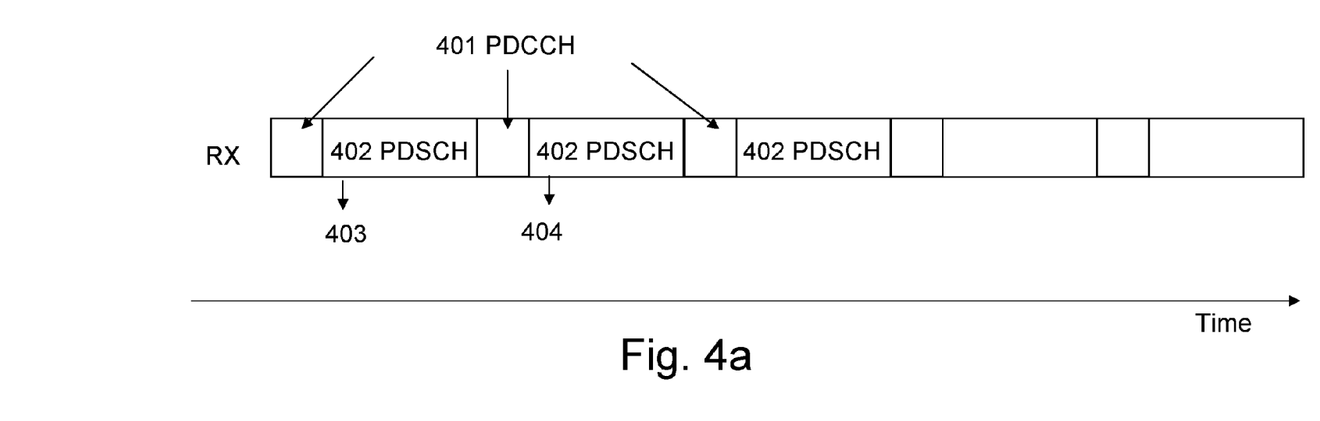
FIGS. 4a and 4b are schematic block diagrams illustrating the frame structure of LTE and WCDMA/HSPA.

FIG. 4a depicts the sub frame structure for LTE. Each frame comprises a first PDCCH part 401 in the beginning of each sub frame and a second PDSCH part 402. The first PDCCH part 401 is in the beginning of each sub frame.

When transmitted, the first PDCCH part 401 is preferably transmitted with a high bit resolution over the chip-to-chip interface 304.

The first PDCCH part 401 is then decoded. During decoding, the samples that are generated out from the ADC 301 are stored in the buffer 303.

The decoding of the first PDCCH part 401 will reveal the modulation and scheme of the received radio signal 330. That is, the PDCCH gives information of used modulation and coding on parts of the PDSCH dedicated to the communication device 100, such as user equipment.

According to some embodiments of adapting a bit resolution 313, as depicted by in FIG. 3b, when the first PDCCH part 401 is decoded, the processor circuit 309 adapts the bit resolution needed in the chip-to-chip interface for sufficient channel quality.

For example, if it is detected that 64-QAM is used as modulation scheme, there will be a need of SNR in the range of e.g. 20 dB. Thereby, a high resolution, such as 8-10 bits, from the ADC 301 may be needed in the second PDSCH part 402 transmission 403 when forwarded over the chip-to-chip interface 104, 304.

However, if it is detected that QPSK is used as modulation scheme, where SNR will be in the range of some few dBs, then a low resolution may be sufficient for transferring for example the 2-4 most significant bits, when transferring the second PDSCH part 402 transmission 404 over the chip-to-chip interface 104, 304. This procedure may be repeated on a sub frame to sub frame basis.

According to some embodiments of adapting the bit resolution, the ADC 301 may have a fixed bit resolution 311. Based on the decoded samples, stored in the buffer 303, the processor circuit 309 may control the bit resolution that is needed for the transmission of data over the chip-to-chip interface 104, 304.

Wideband Code Division Multiple Access WCDMA is another multiple-access technology, where user equipments receive data on different downlink channelization codes. A further development of WCDMA is HSPA which allows higher bit rates. In HSPA, the control information is transmitted on High Speed Shared Control Channel HS-SCCH and the data is transmitted on up to 15 High Speed Physical Downlink Shared Channel HS-PDSCH.

Figure 4B:
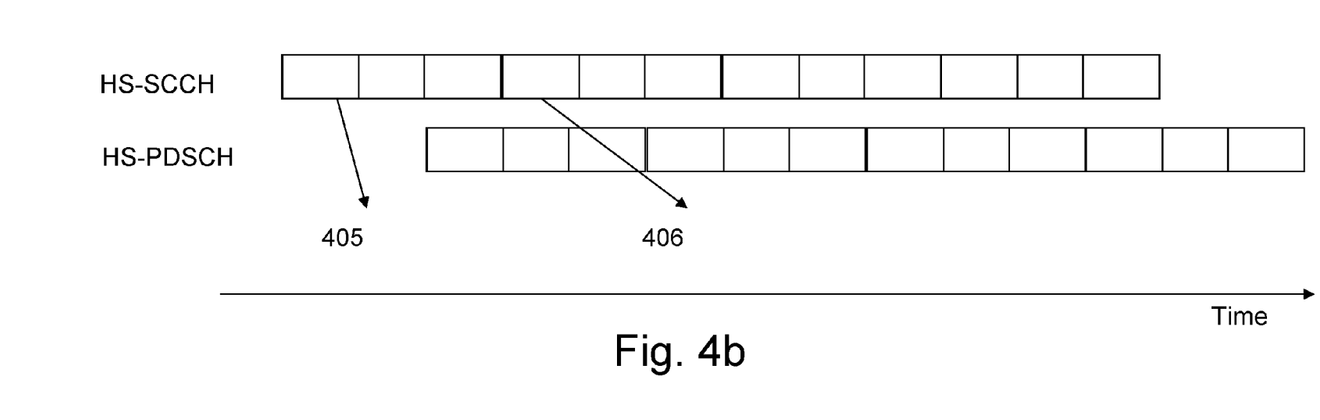

FIG. 4b depicts the frame structure of HSPA. When using HSPA, the principle is similar as what is mentioned above relating to decoding in the LTE. However, the control and data information is staggered. As an example, this may mean that the HS-PDSCH is delayed two slots with respect to HS-SCCH.

The control channel, HS-SCCH, which always uses QPSK modulation, is received and the first slot is decoded. The first slot consists of number of channelization codes as well as modulation such as QPSK, 16-QAM, and 64-QAM to be used in the HS-PDSCH. Until HS-SCCH is decoded, the data is stored in a buffer 303 after an ADC 301, and based on the detected modulation. A processor circuit 309 decides further on the number of bits needed in the transmission over the chip-to-chip interface 104, 304 as depicted by FIG. 3*a*. The above mentioned procedure may be repeated on a sub frame to sub frame basis.

As mentioned above, there is a similarity in the decoding of HSPA with the decoding of LTE. For example as depicted by 405 in FIG. 4*b*, when a 64-QAM modulation is detected by decoding the first part HS-SCCH, a high resolution may be needed in the transmission over the chip-to-chip interface 104, 304.

Further, when a QPSK modulation is detected, as depicted by 406 in FIG. 4*b*, when decoding the first part HS-SCCH, a low resolution may be used in the transmission over the chip-to-chip interface 104, 304.

In case a dedicated physical channel is used, such as when using a speech service in WCDMA, is it known that the modulation is QPSK. Therefore a few bits (2-4) in the chip-to-chip interface 104, 304 may be sufficient.

To perform the method actions, referred to in FIG. 2 above, for adapting a transmission of data to be transferred from a first chip 110, 310 to a second chip 120, 320 over a chip-to-chip interface 104, 304, the communication device 100, as depicted in FIG. 1 and FIG. 3*a-b*, is provided by way of example.

As mentioned before, chip-to-chip interface 104, 304 is a wired connection between the first chip 110 and the second chip 120 within the communication device 100.

The communication device 100 comprises a radio receiver 101 configured to receive a radio signal 330 comprising a transmission of data from another communication device.

The communication device 100 further comprises a processing circuit 309 which is configured to determine the modulation and coding information of the received radio signal 330. The processing circuit 309 further is configured to determine channel quality of the received radio signal 330 based on the determined modulation and coding information.

The processing circuit 309 further is configured to adapt the transmission of data based on the determined channel quality of the received radio signal 330 such that at least the determined channel quality is obtained when transferring the transmission of data.

The processing circuit 309 further is configured to transfer the transmission of data over the chip-to-chip interface 104, 304 to the second chip 320.

The processing circuit 309 may be a processing unit, a processor, an application specific integrated circuit (ASIC), a field-programmable gate array (FPGA) or the like. As an example, a processor, an ASIC, an FPGA or the like may comprise one or more processor kernels.

The communication device may be configured such that channel quality for a current transmission, such as the transmission of data, is adapted, or matched, to channel quality of the received radio signal 330. The adaptation of the channel quality may also depend on standard, such as LTE and WCDMA/HSPA, implemented in the communication device. Furthermore, within a standard for cellular radio communication systems, there may be variations as regards required channel quality. That is, different standards for cellular communication systems may have different maximum SNR (coding/modulation) requirements.

For instance, a user equipment, comprised in a Global System for Mobile Communications (GSM) system, may be aware of that 10 bits will never be required in the ADC and that a maximum number of bits required may be, for instance, 4-5 bits. Hence, an upper bound for the number of bits that possibly may be required is given by the maximum number of bits required. The upper bound is in this case lower than the maximum number of bits required as defined by LTE by 20 MHz.

In some embodiments, the communication device 100 may further comprise a memory 314 for storing software to be executed by, for example, the processing circuit 309. The software may comprise instructions to enable the processor to perform the method in the chip-to-chip interface as described above in conjunction with FIGS. 1 and 3*a-b*. The memory 314 may be a hard disk, a magnetic storage medium, a portable computer diskette or disc, flash memory, random access memory (RAM) or the like. Furthermore, the memory may be an internal register memory of a processor.

According to some embodiments, the received radio signal 330 is a digital communication signal and wherein the processing circuit 309 is configured to adapt the channel quality over the chip-to-chip interface 104, 304 by adjusting an amount of bits per sample of the digital communication signal to be transmitted.

According to some embodiments, the processing circuit 309 further is configured to increase or decrease the amount of bits in relation to a predetermined threshold.

According to some embodiments, the received radio signal 330 is an analogue signal, and wherein the processing circuit 309 is configured to determine the channel quality of the radio signal 330 based on a signal to noise value for the radio signal 330.

According to some embodiments, the processing circuit 309 is configured to adapt the channel quality of the chip-to-chip interface 104, 304, by changing a slew-rate of the analogue signal to be transmitted.

When using the word "comprise" or "comprising" it shall be interpreted as non-limiting, i.e. meaning "consist at least of".

The present disclosure is not intended to be limited to the above described preferred embodiments. Various alternatives, modifications and equivalents may be used. Therefore, the above embodiments should not be taken as limiting the scope of the invention, which is defined by the appending claims.

The invention claimed is:

1. A method in a communication device for adapting a transmission of data to be transferred from a first chip to a second chip over a chip-to-chip interface, wherein the chip-to-chip-interface comprises a wired connection between the first chip and the second chip comprised in the communication device, the method comprising:
   receiving a radio signal comprising the transmission of data from another communication device;
   determining modulation and coding information of the received radio signal;
   determining a channel quality of the received radio signal based on the determined modulation and coding information;
   adapting the transmission of data based on the determined channel quality of the received radio signal such that at least the determined channel quality is obtained when transferring the transmission of data; and
   transferring the transmission of data over the chip-to-chip interface to the second chip,
   wherein the received radio signal is an analog signal, and wherein the determining of the channel quality of the received radio signal is based on a signal to noise value of the received radio signal, and the adapting of the transmission of data such that at least the determined channel quality is obtained when transferring the transmission of data includes any of:

increasing load impedance to reduce the channel quality, or vice versa;

decreasing signal amplitude to reduce the analog signal, or vice versa; and changing a slew-rate of the analogue signal to adapt the channel quality.

2. The method of claim 1, wherein the signal to noise value of the received radio signal is related to a predetermined threshold.

3. A method in a communication device for adapting a transmission of data to be transferred from a first chip to a second chip over a chip-to-chip interface, wherein the chip-to-chip-interface comprises a wired connection between the first chip and the second chip comprised in the communication device, the method comprising:

receiving a radio signal comprising the transmission of data from another communication device;

determining modulation and coding information of the received radio signal;

determining a channel quality of the received radio signal based on the determined modulation and coding information;

adapting the transmission of data based on the determined channel quality of the received radio signal such that at least the determined channel quality is obtained when transferring the transmission of data; and transferring the transmission of data over the chip-to-chip interface to the second chip, wherein the received radio signal is a digital communication signal, and wherein the adapting the transmission of data over the chip-to-chip interface is performed by adjusting an amount of bits per sample of the transmission of data and the transferring of the transmission of data is performed while using a clock rate being adjusted to match the adjusted amount of bits.

4. The method of claim 3, wherein the adjusting of the amount of bits per sample is performed by increasing or decreasing the amount of bits in relation to a predetermined threshold.

5. The method of claim 4, wherein the adjusting of the amount of bits is made to the received radio signal after or in an analog-digital converter.

6. A communication device for adapting a transmission of data to be transferred from a first chip to a second chip over a chip-to-chip interface, which chip-to-chip interface is a wired connection between the first chip and the second chip within the communication device, the communication device comprising:

a radio receiver configured to receive a radio signal comprising the transmission of data;

a processing circuit configured to determine modulation and coding information of the received radio signal, wherein the processing circuit further is configured to determine channel quality of the received radio signal based on the determined modulation and coding information, wherein the processing circuit further is configured to adapt the transmission of data based on the determined channel quality of the received radio signal such that at least the determined channel quality is obtained when transferring the transmission of data; and the processing circuit configured to transfer the transmission of data over the chip-to-chip interface to the second chip, wherein the received radio signal is an analog signal, and wherein the processing circuit is configured to determine the channel quality of the radio signal based on a signal to noise value for the radio signal and the adaption of the transmission of data such that at least the determined channel quality is obtained when transferring the transmission of data includes any of:

increasing load impedance to reduce the channel quality, or vice versa;

decreasing signal amplitude to reduce the analogue signal, or vice versa; and changing a slew-rate of the analogue signal to adapt the channel quality.

7. A communication device for adapting a transmission of data to be transferred from a first chip to a second chip over a chip-to-chip interface, which chip-to-chip interface is a wired connection between the first chip and the second chip within the communication device, the communication device comprising:

a radio receiver configured to receive a radio signal comprising the transmission of data;

a processing circuit configured to determine modulation and coding information of the received radio signal, wherein the processing circuit further is configured to determine channel quality of the received radio signal based on the determined modulation and coding information, wherein the processing circuit further is configured to adapt the transmission of data based on the determined channel quality of the received radio signal such that at least the determined channel quality is obtained when transferring the transmission of data; and the processing circuit configured to transfer the transmission of data over the chip-to-chip interface to the second chip, wherein the received radio signal is a digital communication signal, and wherein the processing circuit further is configured to adapt the channel quality over the chip-to-chip interface by adjusting an amount of bits per sample of the digital communication signal to be transmitted and the transferring of the transmission of data is performed while using a clock rate being adjusted to match the adjusted amount of bits.

8. The communication device of claim 7, wherein the processing circuit further is configured to increase or decrease the amount of bits in relation to a predetermined threshold.

* * * * *